No. 681,335. Patented Aug. 27, 1901.
C. NELSON.
COVER FOR ICE CREAM CABINETS.
(Application filed July 2, 1900.)

(No Model.)

WITNESSES:

INVENTOR
Charles Nelson.
BY
ATTORNEYS

UNITED STATES PATENT OFFICE.

CHARLES NELSON, OF ST. LOUIS, MISSOURI.

COVER FOR ICE-CREAM CABINETS.

SPECIFICATION forming part of Letters Patent No. 681,335, dated August 27, 1901.

Application filed July 2, 1900. Serial No. 22,352. (No model.)

*To all whom it may concern:*

Be it known that I, CHARLES NELSON, a citizen of the United States, residing at St. Louis, State of Missouri, have invented new and useful Improvements in Covers for Ice-Cream Cabinets, of which the following is a specification.

My invention relates to improvements in covers for ice-cream cabinets; and it consists in the novel combination and arrangement of parts, as will be hereinafter more particularly described and claimed.

Figure 1:
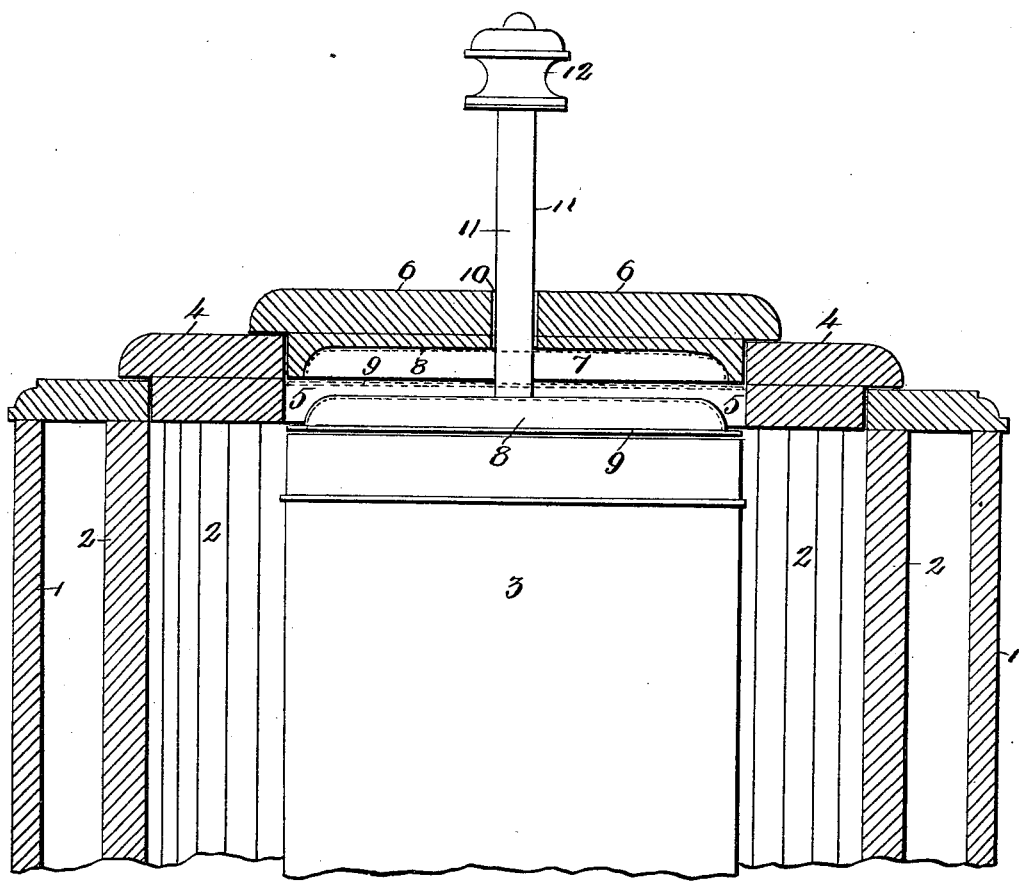
Figure 2:
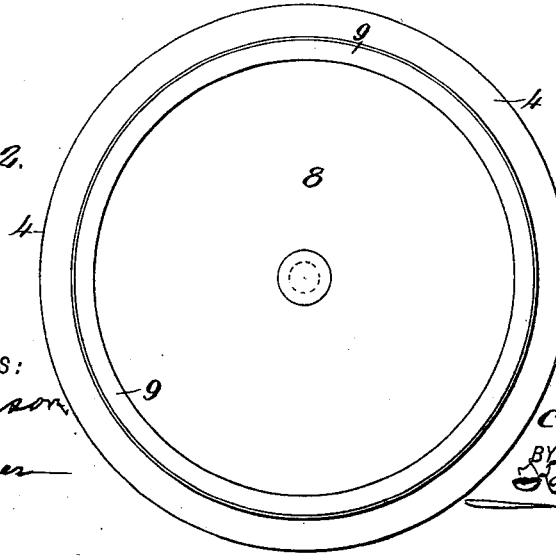

In the drawings, Figure 1 is a combined section and side elevation of my complete invention as applied to an ice-cream cabinet; and Fig. 2 is a bottom plan view of the same, showing the cover removed from the cabinet.

The object of my present invention is to construct a practical cover for ice-cream cabinets such as patented by me on the 14th day of March, 1899, No. 621,273, although it is evident that said cover may be applied to cabinets of other constructions without departing from the nature of my invention; and it consists of a lid or cover having a central opening formed therein, the lower surface of said cover being hollowed out or provided with a circular depression, which is adapted to receive a flanged cover or lid, the flanged portion of which is adapted to coöperate or come in contact with the upper edge of the can containing the ice-cream automatically when the cover is placed in position, and a rod movably located within the opening formed in the first-named cover, the lower end of which is rigidly attached to said lid about its medial portion, the upper end of said rod being provided with a knob which operates as a handle for removing the cover and lid from the ice-cream cabinet, whereby ready access can be had to the ice-cream contained within the can, the construction of the parts being such that the ice-cream can will always automatically be covered when the cover is placed in position to cover the opening in the cabinet, all of which will appear from the description to follow.

Referring to the drawings, 1 represents a cabinet or box constructed similarly to the patent referred to and provided with an ice-chamber 2, composed entirely of wood for receiving the ice-cream can 3 and the ice to be packed around the latter, whereby a circular opening in the top of the cabinet is formed, and covering the space between said opening and ice-cream can is a reducing-cover 4, having an opening 5, whereby the ice located between the can and inner wall of the ice-chamber may be properly covered during the operation of removing the ice-cream from the can contained within the ice-chamber.

The circular opening 5 of the reducing-cover 4 is temporarily covered by a smaller cover 6, the lower surface of which is provided with a circular hollowed-out portion 7, which is adapted to snugly receive the metallic lid 8, the latter having a lower flanged portion 9, the lower flat circular portion of which is adapted to rest upon the upper edge of the ice-cream can 3 automatically in its proper position when the circular cover 6 is placed in a position to cover the opening 5, formed in the reducing-cover 4. Formed in the cover 6 and located about the medial portion of the same is a circular opening 10, through which freely passes the rod 11, which is of suitable length and to the lower end of which is attached the metallic circular lid 8, about its medial portion, the upper end of said rod being provided with a knob 12, which is adapted to be grasped by the hand of the operator when removing the cover 6 from over the opening 5 of the reducing-cover in order to gain access to the ice-cream contained within the ice-cream can.

By the employment of the movable rod 11 the circular metallic lid 8 is adjustable vertically in respect to the cover 6, whereby the ice-cream can will always be covered, notwithstanding the variable heights of the cans that may be contained within the ice-chamber, and consequently the can will be covered under all circumstances when the cover 6 is placed in position over the reducing-cover or that covering the ice contained within the ice-chamber. In the operation of removing the cover 6 from over the opening 5 of the reducing-cover in order to gain access to the ice-cream contained within the can the metallic lid 8 is first elevated and located within the hollowed-out portion 7 of the cover 6, after which the two are bodily lifted together.

By the formation of the lid 8 the ice-cream contained in the can 3 is permitted to always assume its natural formation above the upper edge of said can. Otherwise the pressure of the ice-cream within the can would raise the lid, and consequently the entire device would be inoperative.

Having fully described my invention, what I claim is—

1. A cover for ice-cream cabinets, comprising a reducing-cover 4, having an opening 5, a smaller cover 6, adapted to be received by said opening of the reducing-cover, the lower surface of which is provided with a circular hollowed-out portion 7, a metallic lid 8, having a lower flanged portion 9, the lower flat circular portion of which is adapted to rest upon the upper edge of the ordinary ice-cream can when the circular cover 6, is placed in a position to cover the opening 5, formed in the reducing-cover 4, the medial portion of said lid corresponding in shape to the hollowed-out portion 7, of the smaller cover, a rod 11, the lower end of which is secured to the lid about its medial portion, and adapted to freely pass through an opening formed in the cover 6, and a knob 12, secured to the upper end of said rod, and adapted to be grasped by the hand of the operator for removing said cover 6, as and for the purpose described.

2. An ice-cream cabinet, comprising an outer casing, an ice-chamber surrounded by said casing, a reducing-cover provided with a large central opening fitting over said ice-chamber, a can fitting in said ice-chamber, a smaller cover provided with a small central opening and also with flanges and a hollowed-out or domed portion, said cover fitting in the central opening of the reducing-cover, a metallic lid fitting upon said can and having a domed portion to fit in the hollowed-out portion of the cover, and a handle slidably mounted in the opening of the cover and secured to the can's cover.

In testimony whereof I affix my signature in presence of two witnesses.

CHARLES NELSON.

Witnesses:
C. F. KELLER,
C. J. ANDERSON.